United States Patent [19]

Wood

[11] Patent Number: 4,856,767

[45] Date of Patent: Aug. 15, 1989

[54] RADIATOR LIFTING AND HOLDING APPARATUS

[75] Inventor: Kenneth R. Wood, Fort Wayne, Ind.

[73] Assignee: John M. Wood, Fort Wayne, Ind. ; a part interest

[21] Appl. No.: 200,017

[22] Filed: May 26, 1988

[51] Int. Cl.[4] .................. B23Q 1/00

[52] U.S. Cl. .................. 269/46; 269/156; 269/208; 254/88

[58] Field of Search .................. 269/46, 69, 71, 140, 269/142, 156, 208; 298/90, 91; 254/88

[56] References Cited

U.S. PATENT DOCUMENTS

| | | | |
|---|---|---|---|
| 1,634,227 | 6/1927 | Alford et al. | 269/145 |
| 1,823,204 | 9/1931 | Long . | |
| 2,576,660 | 11/1951 | Williams | 212/64 |
| 2,602,990 | 7/1952 | Ferguson | 29/290 |
| 2,669,013 | 2/1954 | Wilson | 269/46 |
| 2,679,092 | 5/1954 | Austin | 29/290 |
| 3,027,158 | 3/1962 | Barbee | 269/156 |
| 3,301,547 | 1/1967 | Jordan | 269/20 |
| 3,863,890 | 2/1975 | Rutting | 254/88 |
| 4,216,947 | 8/1980 | Chausse | 269/71 |
| 4,324,393 | 4/1982 | Chausse | 269/46 |
| 4,531,720 | 7/1985 | Söder | 269/208 |

*Primary Examiner*—Judy Hartman
*Attorney, Agent, or Firm*—Jeffers, Hoffman & Niewyk

[57] ABSTRACT

A radiator lifting and holding apparatus includes an upright support stand, a radiator clamping mechanism, a stop mechanism, and a radiator winch-type lifting mechanism. The clamping mechanism includes a pair of clamping members coupled to respective upright post members of an upright structure of the support stand for adjustable movement toward and away from one another for clamping a radiator therebetween at a desired elevation above the ground while at the same time allowing rotation of the radiator to a desired angular position. The stop mechanism is mounted on one upright post member of the support stand and is cooperable with one of the clamping members to lock the radiator against further rotation and thus maintain it stationary at the desired angular position. The lifting mechanism is mounted to the support stand upright structure independently of the clamping mechanism and is operable independently of operation of the clamping mechanism for elevating the radiator from a ground level position at a base of the support stand to the desired elevation thereabove and into alignment with the clamping mechanism. Also, an inclined ramp structure is mounted on the support stand base and configured to facilitate slidably moving the radiator upwardly and onto the base and into a position for grasping thereof by the lifting mechanism.

17 Claims, 2 Drawing Sheets

RADIATOR LIFTING AND HOLDING APPARATUS

BACKGROUND OF THE INVENTION

The present invention generally relates to equipment for facilitating radiator repair and, more particularly, is concerned with a radiator lifting and holding apparatus.

Radiators used in cooling systems of internal combustion engines typically include a large rectangular housing having internal fluid passages enclosed by fins which radiate heat from the passages to the external atmosphere. Thus, by nature of their construction and size, radiators are difficult to manually lift and handle for performing repairs thereon.

A variety of devices appear in the prior art for mechanically lifting and handling radiators. Representative of the prior art are the devices disclosed in U.S. Patents to Alford et al (U.S. Pat. No. 1,634,227), Long (U.S. Pat. No. 1,823,204), Williams (U.S. Pat. No. 2,576,660), Ferguson (U.S. Pat. No. 2,602,990), Austin (U.S. Pat. No. 2,679,092), Barbee (U.S. Pat. No. 3,027,158), Jordan (U.S. Pat. No. 3,301,547) and Chausse (U.S. Pat. Nos. 4,216,947 and 4,324,393), and in an advertisement on page 16 of the 1987 Automotive Cooling Journal. While many of these prior art devices might operate reasonably well and generally achieve their objectives under the limited range of operating conditions for which they were designed, most have shortcomings which make them less than an optimum device for lifting and handling radiators for performing repairs. Most devices have large numbers of parts and complex constructions making them expensive to manufacture and difficult and awkward to operate. Some of the complexity and complication of many of the devices is due to the mounting of their components for clamping and rotating the radiator to their components for lifting the radiator.

Consequently, a need still exists for an improved device for mechanically lifting and handling a radiator which avoids the above-cited shortcomings of the prior art devices.

SUMMARY OF THE INVENTION

The present invention provides a radiator lifting and holding apparatus designed to satisfy the aforementioned needs. The apparatus according to a preferred embodiment of the present invention incorporates several features which simplify its overall construction and operation and thereby enhance the capabilities of those persons employing the apparatus in carrying out the repair and refurbishing of radiators.

One feature relates to the overall sturdy and stable construction of an upright support stand of the apparatus wherein a pair of post members are mounted upright and in spaced apart relation on a stabilizing base. Another feature relates to deployment of a winch-type lifting mechanism and a clamping mechanism independent of one another on the upright support stand. Yet another feature relates to a ramp structure provided on the stabilizing base of the support stand below the lifting mechanism which facilitates moving a radiator into a position for grasping and lifting by the lifting mechanism.

Still another feature relates to the clamping mechanism having one clamping member adjustable between unlimited or infinite number of positions and the other clamping member being adjustable between only a limited or finite number of positions, thereby providing fine and coarse adjustments of the clamping mechanism. Yet another feature relates to the clamping members having mounted thereon freely rotatable, clamping pressure applying pads, thereby permitting rotation of the radiator to a desired angular position after it has been clamped at a desired elevation. A further feature relates to a stop mechanism on the support stand operable in cooperation with one of the clamping members to lock the radiator against further rotation and thus maintain it stationary at a desired angular position.

Accordingly, the present invention is directed to a radiator lifting and holding apparatus which comprises an upright support stand having a ground-supported stabilizing base and an elongated structure mounted upright on the base and a clamping mechanism mounted to the elongated upright structure of the support stand at a desired elevation above the ground between a top of the support stand elongated structure and the base of the support stand, the clamping mechanism being operable for clamping a radiator at the desired elevation while at the same time allowing rotation of the radiator to a desired angular position. A stop mechanism is mounted on the elongated upright structure of the support stand and is cooperable with the clamping mechanism to lock the radiator against further rotation and thus maintain it stationary at a desired angular position. A lifting mechanism is mounted to the elongated upright structure of the support stand independently of the clamping mechanism and is operable independently of operation of the clamping mechanism for elevating the radiator from a ground level position at the base to the desired elevation thereabove and into alignment with the clamping mechanism.

More particularly, the elongated upright structure of a preferred embodiment of the support stand apparatus includes a pair of post members mounted upright and in spaced apart relation on the base, and a top member extending between and interconnecting the post members at upper ends thereof. The base of the support stand extends between and interconnecting the post members at lower ends thereof.

Further, the clamping mechanism of the apparatus includes first and second clamping members coupled to the respective post members for adjustable movement toward and away from one another. The first clamping member is coupled to one of the post members for fine adjustment between an infinite number of positions. The second clamping member is coupled to the other of the post members for coarse adjustment between a finite number of positions for clamping the radiator between the first and second clamping members at the desired elevation. Also, the clamping members have freely rotatable elements adapted to apply clamping pressure to the radiator for holding the radiator at the desired elevation and at the same time for permitting rotation of the radiator to the desired angular position after it has been clamped at the desired elevation by the clamping members.

Also, the stop mechanism of the apparatus includes an elongated stop member and a lock member. The elongated stop member is slidably mounted to one of the post members adjacent one of the clamping members. The stop member is slidably movable between engaging and disengaging positions relative to the pressure-applying element on the one clamping member. The lock member movable between unlocking and locking positions relative to the stop member such that the stop and lock members are cooperable with one another and the one clamping member pressure-applying element to lock the radiator against further rotation and thus maintain it stationary at the desired angular position.

The lifting mechanism of the apparatus includes a load-grasping component, a load-hoisting component mounted to one of the post members of the support stand elongated structure, and an elongated flexible member interconnecting the load-grasping and load-hoisting components. Upon operation of the load-hoisting component, the flexible member is movable along the top member and the one post member of the support stand elongated structure for raising and lowering the load-grasping component.

The apparatus also includes an inclined ramp structure mounted on the base of the support stand below the load-grasping component of the lifting mechanism. The ramp structure is configured to facilitate slidably moving the radiator upwardly and onto the base and into a position for grasping thereof by the load-grasping component of the lifting mechanism.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
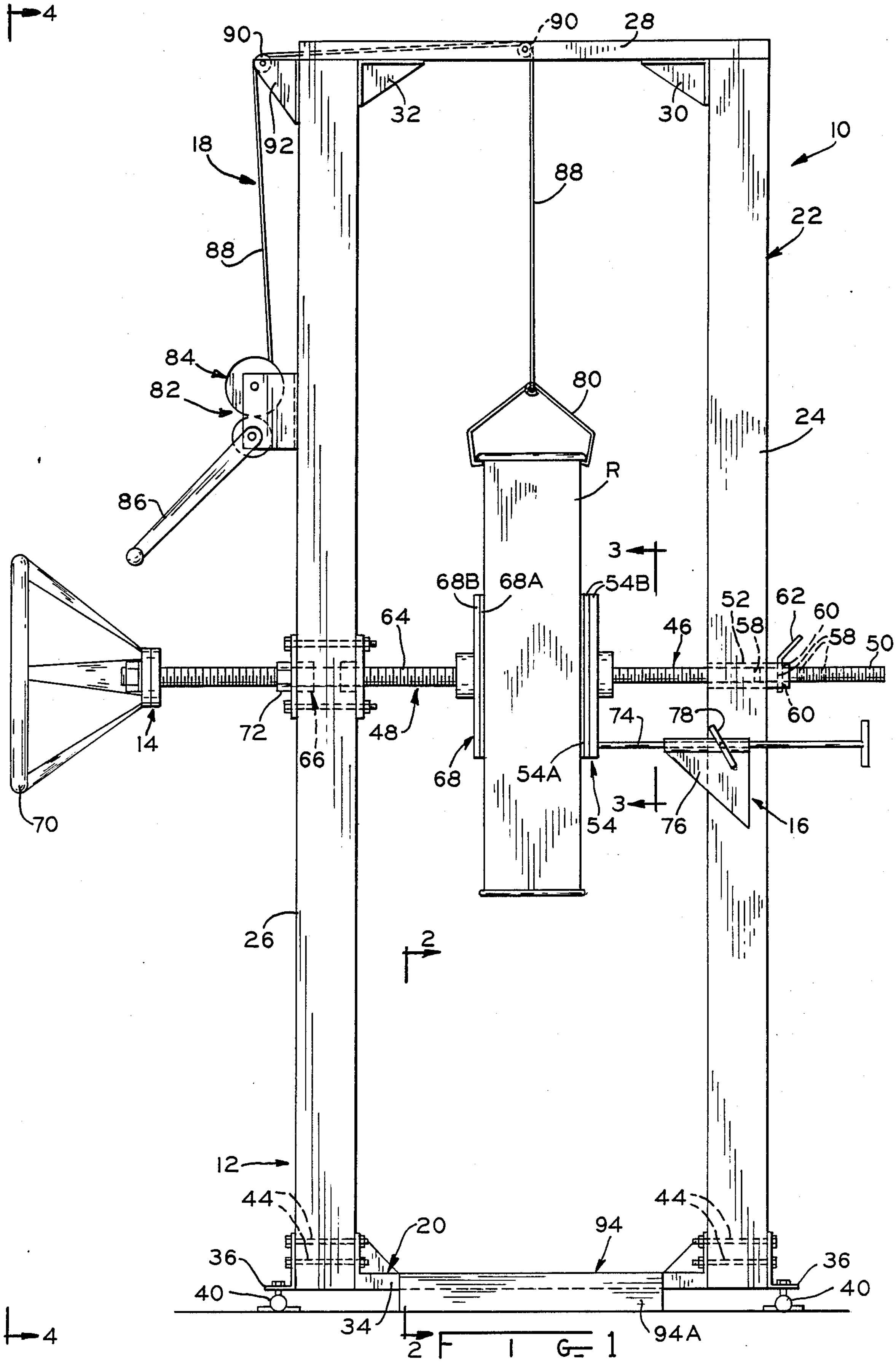
FIG. 1 is a side elevational view of a radiator lifting and holding apparatus constructed in accordance with the principles of a preferred embodiment of the present invention.
Figure 2:
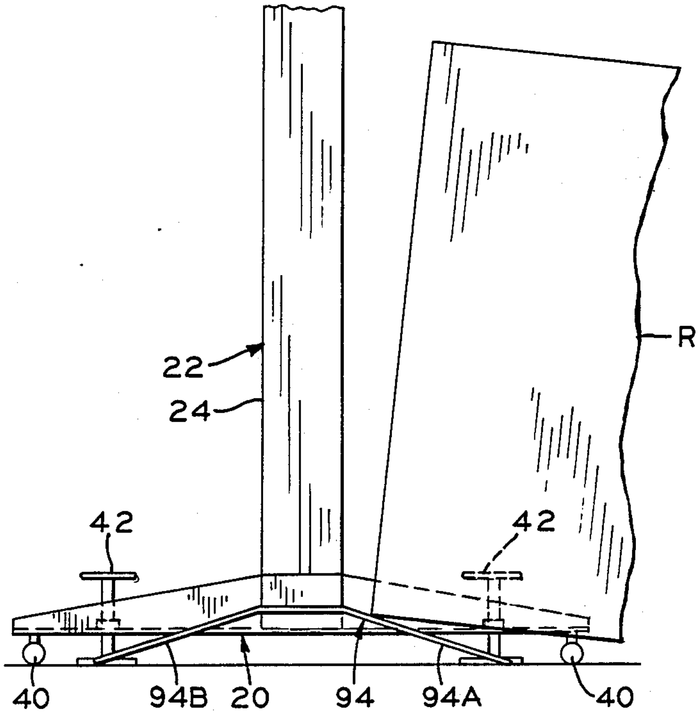
FIG. 2 is a fragmentary sectional view of the apparatus as seen along line 2—2 of FIG. 1.
Figure 4:
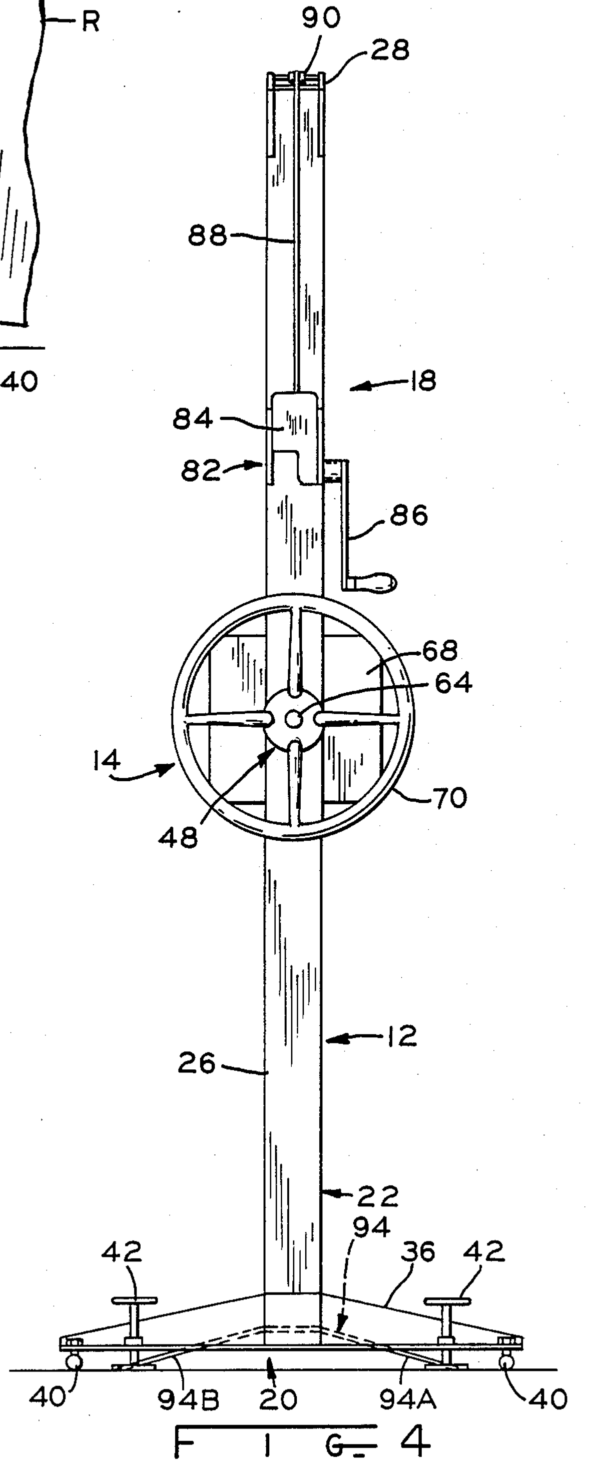
FIG. 4 is an end elevational view, on a smaller scale, of the apparatus as seen along line 4—4 of FIG. 1.

Referring now to the drawings, and particularly to FIGS. 1 and 4, there is shown a radiator lifting and holding apparatus, generally designated by the numeral 10 and constituting the preferred embodiment of the present invention. In its basic components, the apparatus 10 is composed of an upright support stand 12, a radiator clamping mechanism 14, a stop mechanism 16, and a radiator winch-type lifting mechanism 18.

More particularly, the upright support stand 12 of the apparatus 10 has a ground-supported stabilizing base 20 and an elongated upright structure 22. The elongated structure 22 of the support stand 12 includes a pair of post members 24, 26 mounted upright and in spaced apart relation on the base 20 and a top reinforcing member 28 extending between and interconnecting the post members 24, 26 at their upper ends. Also, angle brackets 30, 32 are attached at the interior sides of the upper ends of the post members 24, 26 for providing support for the top reinforcing member 28.

The stabilizing base 20 of the support stand 12 includes a bottom reinforcing member 34 extending between and interconnecting the post members 24, 26 at interior sides of their lower ends. Further, the base 20 has a pair of side rails 36, 38 attached to the exterior sides of the post members 24, 26 at their lower ends and extending in transverse relation to the bottom reinforcing member 34 as so to stabilize the upright structure 22 against sidewise tipping. Each of the side rails 36, 38 has a pair of ground-engaging support rollers 40 attached respectively to opposite ends of the rails, and a pair of adjustable footers 42 mounted thereto adjacent to and inwardly from the respective support rollers 40. In case the floor or ground surface supporting the stand 12 is not level, the adjustable footers 42 are lowered to compensate for that condition in which case one or more of the footers 42 and not the adjacent rollers 40 would support the stand 12. As depicted in FIG. 1, sets of elongated bolts 44 are used to attach the bottom member 34 and the side rails 36, 38 of the base 20 to the respective lower ends of the post members 24, 26.

The clamping mechanism 14 of the apparatus 10 is mounted to the upright elongated structure 22 of the support stand 12 at a desired elevation above the ground between the top member 28 and the stabilizing base 20 thereof. The desired elevation is normally one that appropriately locates a radiator R so that a workman of average height would be able to work on the radiator R while standing erect. The clamping mechanism 14 is operable for clamping the radiator R, as seen in FIG. 1, at the desired elevation. At the same time, the clamping mechanism 14 is adapted to allow rotation of the clamped radiator R by the workman to a desired angular position. Once the radiator R has been rotated to the desired angular position, then the stop mechanism 16, which will be described in detail later on, can be operated in cooperation with the clamping mechanism 14 to lock the radiator R against further rotation and thus maintain it stationary at the desired angular position.

Figure 3:
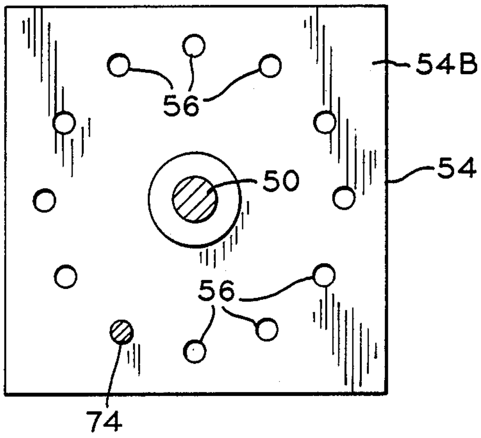
FIG. 3 is an enlarged sectional view of a clamping pressure applying pad of the apparatus as seen along line 3—3 of FIG. 1.

More particularly, the clamping mechanism 14 of the apparatus 10 has a pair of clamping members 46, 48 coupled to the respective post members 24, 26 for adjustable movement horizontally toward and away from one another. The right clamping member 46 of the clamping mechanism 14, as seen in FIG. 1, includes an elongated shaft 50 slidable horizontally through a sleeve 52 attached to the right post member 24. The inner end of the shaft 50 has a clamping pressure applying pad 54 mounted thereon for free rotation relative to the shaft 50 about the axis thereof. The pad 54 includes a front portion 54A composed of resilient material, such as rubber, and a rear portion 54B composed of rigid material, such as steel. As seen in FIG. 3, a series of holes 56 arranged spaced apart and in a circle are drilled in the surface of the rigid rear portion 54B of the pressure applying pad 54. Also, the shaft 50 has a series of spaced apart vertical holes 58 defined therethrough and the sleeve 52 has one pair of holes 60 therein at its outer end which projects outwardly from the post member 24. When a desired one of the shaft holes 58 is aligned with the holes 60 in the sleeve 52, a lock pin 62 is inserted through the aligned holes to lock the shaft 50 at the particular position along the sleeve. In such manner, the right clamping member 46 is coupled to the right post member 24 for coarse adjustment along the sleeve 52 between a finite number of positions, as represented by the locations of the holes 58 in its slidable shaft 50, for bringing the right pressure applying pad 54 adjacent to one side of the radiator R. Of course, conversely, by withdrawing the lock pin 62, the right clamping member 46 can be slid away from the radiator R and toward the right post member 24.

The left clamping member 48 of the clamping mechanism 14, as seen in FIG. 1, includes an externally-threaded elongated shaft 64 threadly coupled through an internally-threaded sleeve assembly 66 attached to the left post member 26. The inner end of the shaft 64 has a clamping pressure applying pad 68 mounted thereon for free rotation relative to the shaft 64 about the axis thereof. The pad 68 includes a front portion 68A composed of resilient material, such as rubber, and a rear portion 68B composed of rigid material, such as steel. A manually-operated adjusting wheel 70 is attached to the outer end of the shaft 64 and an adjustable lock element 72, such as a nut, is threaded on the shaft 64 for tightening against outer side of the sleeve assembly 66 to lock the shaft 64 against rotation. In such manner, the left clamping member 48 is coupled to the left post member 26 for fine adjustment along the sleeve assembly 66 between an infinite number of positions merely by turning the adjusting wheel 70. Rotation of the wheel 70 in one direction brings the left pressure applying pad 68 adjacent to other side of the radiator R for clamping the radiator between the right and left pads 54, 68. Of course, conversely, by counterrotating the wheel 70, the left clamping member 46 can be withdrawn away from the radiator R and toward the left post member 26.

The clamping pressure applying pads 54, 68, by being freely rotatably mounted on the inner ends of the clamping member shafts 50, 64 are adapted to allow rotation of the radiator R about the aligned axes of the clamping members 46, 48 while applying clamping pressure to opposite sides of the radiator R for holding it at the desired elevation. Thus, the clamping mechanism 14 permits the workman to rotate the radiator R to the desired angular position for making repairs to the radiator after it has been clamped at the desired elevation.

The stop mechanism 16 of the apparatus 10 can then be employed by the workman to lock the radiator R at the desired angular position to hold it stationary while the repairs are carried out. As seen in FIG. 1, the stop mechanism 16 is mounted to the right post member 24 of the support stand 12 adjacent to the right clamping member 46. The stop mechanism 16 includes an elongated bar-like stop member 74 slidably mounted to a sleeve assembly 76 attached on the right post member 24. The stop member 74 is slidably movable between engaging and disengaging positions with one of the holes 56 in the rear pad portion 54B of the right pressure applying pad 54. The stop mechanism 16 also includes a lock member 78 threaded into the sleeve assembly 76 and being threadably movable between unlocking and locking positions relative to the stop member 74. In the locking position, the lock member 78 is threaded against the stop member 74 to keep it from sliding relative to the sleeve assembly 76. Thus, the stop and lock members 74, 78 are cooperable with one another and with the right clamping member pressure-applying pad 54 to lock the radiator R against further rotation and thus maintain it stationary at the desired angular position.

As can be seen in FIGS. 1 and 4, the winch-type lifting mechanism 18 of the apparatus 10 is mounted to the support stand 12 independently of and spaced from the clamping mechanism 14. Also, the lifting mechanism 18 is operable independently of operation of the clamping mechanism 14 for lowering and raising the radiator R between a generally ground level position at the stabilizing base 20 of the stand 12 and the desired elevation thereabove wherein the radiator is located between the post members 24, 26 and in alignment with and between the clamping members 46, 48 of the clamping mechanism 14.

More particularly, the winch-like lifting mechanism 18 includes a load-grasping component 80 in the form of a hook assembly, a load-hoisting component 82 in the form of a gear unit 84 with an automatic lock and a handle 86 for actuating the gear unit 82, and an elongated flexible member 88 in the form of wound steel wire or cable. The load-hoisting component 82 is attached to the left post member 26 of the support stand 12 and the flexible cable 88 extends from the gear unit 84, over a pair of pulleys 90 rotatably mounted respectively at the upper end of the left post member 26 by a bracket 92 and at the middle of the top member 28, to the hook assembly 80 which is suspended between the post members 24,26. By appropriately rotating the handle 86, the flexible cable 88 is either paid out from or wound about the gear unit 84 for lowering or raising the hook assembly 80 toward or away from the base 20 of the support stand 12.

As can be readily understood, operation of the lifting mechanism 18 to hook its hook assembly 10 to the radiator R and then raise the radiator R into alignment with the clamping mechanism 14 occurs independently of operation of the clamping mechanism 14. The latter remains in an idle state unclamped from the radiator R. Once the radiator R is aligned with the clamping mechanism 14, the latter is operated independently of operation of the lifting mechanism 18 to clamp the radiator R. Thereafter, the hook assembly 80 is unhooked from the radiator and raised above it. Now the radiator R can be rotated on the clamping mechanism 14 to the desired angular position where it can then be locked by use of the stop mechanism 16.

Additionally, the lifting and holding apparatus 10 has a ramp structure 94 composed of oppositely inclined plates 94A, 94B attached at their upper ends on the bottom member 34 of the base 20 of the support stand 12 and extending outwardly and downwardly therefrom. The inclined relationship of the opposing plates 94A, 94B of the ramp structure 94 facilitates slidably moving the radiator R upwardly and onto the base 20 from either side thereof and into a position aligned below the hook assembly 80 of the lifting mechanism 18. Thus, the ramp structure 94 makes it easier for the workman to manually slide the radiator into an appropriate position for grasping it by the hook assembly 80 of the lifting mechanism 18.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and falls within the limits of the appended claims.

What is claimed is:

1. A radiator lifting and holding apparatus comprising:

an upright support stand having a ground-supported stabilizing base and a support structure mounted upright on said base having opposed upright members;

a clamping means mounted to said upright structure of said support stand at a desired elevation above the ground between a top of said support stand elongated structure and said base of said support stand, said clamping means being operable for clamping a radiator at the desired elevation while at the same time allowing rotation of the radiator to a desired angular position, said clamping means comprising first and second pressure pad means associated with respective opposed upright members for frictionally gripping a radiator, one of said pressure pad means being coupled to said stand for adjustable movement toward and away from the other said pressure pad means along a clamping axis, each of said pressure pad means being rotatable relative to said stand about said clamping axis to thereby hold a radiator at a desired elevation and at the same time permit rotation of the radiator after it has been clamped at the desired position;

stop means mounted on said apparatus for locking one of said pressure pad means against further rotation and thus maintain a radiator gripped thereby stationary at the desired angular position; and a lifting means mounted to said support structure of said support stand independently of said clamping means and being operable independently of operation of said clamping means for elevating the radiator from a ground level position at said base to the desired elevation thereabove and into alignment with said clamping means.

2. The apparatus as recited in claim 1, further comprising an inclined ramp structure mounted on said base of said support stand and being configured to facilitate slidably moving the radiator upwardly and onto said base and into a position for grasping thereof by said lifting means.

3. The apparatus as recited in claim 1, wherein said upright structure of said support stand includes a pair of post members mounted upright and in spaced apart relation on said base.

4. The apparatus as recited in claim 1, wherein said first pressure pad means is coupled to one of said post members for fine adjustment between an infinite number of positions and said second pressure pad means is coupled to the other of said post members for coarse adjustment between a finite number of positions for clamping the radiator between said first and second pressure pad means at the desired elevation.

5. The apparatus as recited in claim 3, wherein said stop means includes:

an elongated stop member slidably mounted to one of said post members adjacent to one of said pressure pad means, said stop member being slidably movable between engaging and disengaging positions relative to said one pressure pad means, said stop means including means on said one pressure pad means cooperable with said stop member to form a plurality of engaged positions of said one pressure pad means relative to said stop member to thereby lock the radiator against further rotation and thus maintain it stationary at the desired angular position; and a lock means for selectively locking said stop member in an engaged position with said one pressure pad means.

6. The apparatus as recited in claim 3, wherein:

said support stand includes a top member extending between and interconnecting said post members at upper ends thereof; and said lifting means includes a load-grasping component, a load-hoisting component mounted to one of said post members of said support stand elongated structure, and an elongated flexible member interconnecting said load-grasping and load-hoisting components and upon operation of said load-hoisting component said load-grasping component is movable along said top member and said one post member of said support stand elongated structure for raising and lowering said radiator.

7. The apparatus as recited in claim 6, wherein:

said base of said support stand extends between and interconnects said post members at lower ends thereof; and said apparatus includes an inclined ramp structure mounted on said base of said support stand below said load-grasping component of said lifting mechanism and being configured to facilitate slidably moving the radiator upwardly and onto said base and into a position for grasping thereof by said load-grasping component of said lifting mechanism.

8. A radiator lifting and holding apparatus comprising:

an upright support stand having a ground-supported stabilizing base and an elongated structure mounted upright on said base, said elongated structure including a pair of post members mounted upright and in spaced apart relation on said base and a top member extending transversely between and interconnecting said post members at upper ends thereof;

a clamping means mounted to opposing post members of said elongated upright structure of said support stand at a desired elevation above the ground between said top member of said support stand elongated structure and said base of said support stand, said clamping means being operable for clamping a radiator at the desired elevation while at the same time allowing rotation of the radiator to a desired angular position, said clamping means comprising first and second pressure pad means associated with respective said opposing post members for frictionally gripping a radiator, one of said pressure pad means being coupled to said stand for adjustable movement toward and away from the other said pressure pad means along a clamping axis, each of said pressure pad means being rotatable relative to said stand about said clamping axis to thereby hold a radiator at a desired elevation and at the same time permit rotation of the radiator after it has been clamped at the desired position;

stop means mounted on one of said post members of said support stand upright structure adjacent to said clamping means, said stop means locking one of said pressure pad means against further rotation and thus maintain a radiator gripped thereby stationary at the desired angular position; and a winch-type lifting means mounted to said support stand independently of said clamping means and supported by said top member and being operable independently of operation of said clamping means for elevating the radiator from a ground level position at said base to the desired elevation thereabove between said post members and into alignment with said clamping means, said lifting means having a load-grasping component, a load-hoisting component mounted to one of said post members of said support stand elongated structures, and an elongated flexible member interconnecting said load-grasping and load-hoisting components and upon operation of said load-hoisting component, said load-grasping component is movable along said top member and said one post member of said support stand elongated structure for raising and lowering

9. The apparatus as recited in claim 8, further comprising:

an inclined ramp structure mounted on said base of said support stand and being configured to facilitate slidably moving the radiator upwardly and onto said base and into a position for grasping thereof by said load-grasping component of said lifting means.

10. The apparatus as recited in claim 8, wherein said first pressure pad means is coupled to one of said post members for fine adjustment between an infinite number of positions and said second pressure pad means is coupled to the other of said post members for coarse adjustment between a finite number of positions for clamping the radiator between said first and second pressure pad means at the desired elevation.

11. The apparatus as recited in claim 8, wherein said stop means includes:

an elongated stop member slidably mounted to one of said post members adjacent to one of said pressure pad means, said stop member being slidably movable between engaging and disengaging positions relative to said one pressure pad means, said stop means including means on said one pressure pad means cooperable with said stop member to form a plurality of engaged positions of said one pressure pad means relative to said stop member to thereby lock the radiator against further rotation and thus maintain it stationary at the desired angular position; and a lock means for selectively locking said stop member in an engaged position with said one pressure pad means.

12. The apparatus as recited in claim 8, whrein said base of said support stand extends between and interconnects said post members at lower ends thereof; and said apparatus includes an inclined ramp structure mounted on said base of said support stand below said load-grasping component of said lifting means and being configured to facilitate slidably moving the radiator upwardly and onto said base and into a position for grasping thereof by said load-grasping component of said lifting means.

13. A radiator lifting and holding apparatus, comprising:

an upright support stand having a ground-supported stabilizing base and an elongated structure mounted upright on said base, said elongated upright structure including a pair of post members mounted upright and in spaced apart relation on said base and a top member extending between and interconnecting said post members at upper ends thereof, said base extending between and interconnecting said post members at lower ends thereof;

a clamping means mounted to said elongated upright structure of said support stand at a desired elevation above the ground between said top member of said support stand elongated structure and said base of said support stand, said clamping means being operable for clamping a radiator at the desired elevation while at the same time allowing rotation of the radiator to a desired angular position, said clamping means having first and second clamping members coupled to said respective post members for adjustable movement toward and away from one another for clamping the radiator therebetween at the desired elevation;

said clamping members having freely rotatably mounted thereon respective pads adapted to apply clamping pressure to the radiator for holding the radiator at the desired elevation and at the same time for permitting rotation of the radiator to the desired angular position after it has been clamped at the desired elevation by said clamping members:

a stop means mounted on one of said post members of said support stand upright structure adjacent to one of said clamping members of said clamping means, said stop means being cooperable with said pressure applying pad on said one clamping member to lock said pad and thereby the radiator against further rotation and thus maintain it stationary at the desired angular position; and a winch-type lifting means mounted to said support stand independently of said clamping means and being operable independently of operation of said clamping means for elevating the radiator from a ground level position at said base to the desired elevation thereabove between said post members and into alignment with and between said clamping members of said clamping means, said lifting means having a load-grasping component, a load-hoisting component mounted to one of said post members of said support stand elongated structures, and an elongated flexible member interconnecting said load-grasping and load-hoisting components and upon operation of said load-hoisting component, said load-grasping component is movable along said top member and said one post member of said support stand elongated structure for raising and lowering said radiator.

14. The apparatus as recited in claim 13, wherein said first clamping member is coupled to one of said post members for fine adjustment between an infinite number of positions and said second clamping member is coupled to the other of said post members for coarse adjustment between a finite number of positions for clamping the radiator between said first and second clamping members at the desired elevation.

15. The apparatus as recited in claim 13, wherein said stop means includes:

an elongated stop member slidably mounted to one of said post members adjacent to one of said clamping members, said stop member being slidably movable between engaging and disengaging positions relative to said pressure-applying pad on said one clamping member, said stop means including means on said pressure pad on said one clamping member cooperable with said stop member to form a plurality of engaged positions of said clamping member relative to said stop member to thereby lock the radiator against further rotation and thus maintain it stationary at the desired angular position; and a lock means for selectively locking said stop member in an engaged position with said clamping member.

16. The apparatus as recited in claim 13, further comprising:

an inclined ramp structure mounted on said base of said support stand below said load-grasping component of said lifting means and being configured to facilitate slidably moving the radiator upwardly and onto said base and into a position for grasping thereof by said load-grasping component of said lifting means.

17. A radiator lifting and holding apparatus comprising:

an upright support stand having a ground supported stabilizing base and a support structure mounted upright on said base, said upright structure of said support stand including a pair of post members mounted upright and in spaced-apart relation on said base;

a clamping means mounted to said upright structure of said support stand at a desired elevation above the ground between a top of said support stand elongated structure and said base of said support stand, said clamping means being operable for clamping a radiator at the desired elevation while at the same time allowing rotation of the radiator to a desired angular position, said clamping means including first and second clamping members coupled to said respective post members for adjustable movement toward and away from one another, said clamping members having freely rotatably mounted thereon respective elements adapted to apply clamping pressure to the radiator for holding the radiator at the desired elevation and at the same for permitting rotation of the radiator to the desired angular position after it has been clamped at the desired elevation by said clamping members;

stop means mounted on said apparatus cooperable with said clamping means for locking the radiator against further rotation and thus maintain it stationary at the desired angular position, said stop means including an elongated stop member slidably mounted to one of said post members adjacent to one of said clamping members, said stop member being slidably moveable between engaging and disengaging positions relative to said pressure-applying element on said one clamping member, said stop means including means on said one clamping member cooperable with said stop member to form a plurality of engaged positions of said clamping member relative to said stop member to thereby lock the radiator against further rotation and thus maintain it stationary at the desired angular position, and a lock member means for selectively locking said stop member in an engaged position with said clamping member; and a lifting means mounted to an upper portion of said upright structure of said support stand independently of said clamping means and being operable independently of operation of said clamping means for elevating the radiator from a ground level position at said base to the desired elevation thereabove and into alignment with said clamping means.

* * * * *

UNITED STATES PATENT AND TRADEMARK OFFICE

CERTIFICATE OF CORRECTION

PATENT NO. : 4,856,767

DATED : August 15, 1989

INVENTOR(S) : Kenneth R. Wood

It is certified that error appears in the above-identified patent and that said Letters Patent is hereby corrected as shown below:

Claim 8, Col. 9, line 12, after "lowering" insert --said radiator.--;

Claim 12, Col. 9, line 46, change "whrein" to --wherein--.

Signed and Sealed this

Twelfth Day of June, 1990

*Attest:*

HARRY F. MANBECK, JR.

*Attesting Officer* *Commissioner of Patents and Trademarks*